United States Patent [19]

Föhl

[11] 4,392,619
[45] Jul. 12, 1983

[54] AUTOMATIC ROLL-UP DEVICE FOR A SAFETY BELT

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 242,179

[22] Filed: Mar. 10, 1981

[30] Foreign Application Priority Data

Mar. 13, 1980 [DE] Fed. Rep. of Germany ....... 3009701

[51] Int. Cl.³ .................. A62B 35/02; B65H 75/48
[52] U.S. Cl. ..................... 242/107.2; 242/107.4 A; 242/107.4 B
[58] Field of Search ....... 242/107.2, 107.4 R–107.4 E; 280/806–808; 297/474–478

[56] References Cited

U.S. PATENT DOCUMENTS 4,195,795 4/1980 Ardizio ........................ 242/107.2
4,258,887 3/1981 Fohl et al. ............... 242/107.4 B X
4,323,204 4/1982 Takada ........................ 242/107.2

Primary Examiner—John M. Jillions
Attorney, Agent, or Firm—Herbert L. Lerner; Laurence A. Greenberg

[57] ABSTRACT

Automatic roll-up device for retarding movement of a safety belt when a predetermined acceleration or deceleration is exceeded, combined with a braking- or clamping device in which the retarded belt is arrested. The roll-up device has a retarding mechanism which blocks a control disc causing braking of the belt roller. This causes a change in movement of the belt which activates the braking- or clamping device. The latter immediately arrests movement of the belt and absorbs any pulling forces which would have been exerted against the retarding mechanism. The roll-up device can be of light-weight construction.

11 Claims, 8 Drawing Figures

AUTOMATIC ROLL-UP DEVICE FOR A SAFETY BELT

CROSS-REFERENCE TO RELATED APPLICATION

Application Ser. No. 240,153 filed for Artur Föhl, on Mar. 3, 1981.

BACKGROUND OF THE INVENTION

1. Field of the Invention

The invention relates to an automatic roll-up device for a safety belt having a device for blocking the belt band in case of danger, which device is automatically activated when a predetermined acceleration or deceleration of the vehicle is exceeded.

2. Description of the Prior Art

In the known roll-up automatic roll-up devices for safety belts, (U.S. Pat. No. 3,901,459) a wind-up spring is arranged at one side of the belt shaft which is supported in a stable housing, while the opposite shaft end is in connection with a detenting locking device and with a release mechanism. In case of danger, for example, in case of a crash, the release mechanism (activating sensor), which is provided with an inertia mass, acts on a control disc, and the control disc effects the complete blocking of the belt shaft and, thereby, of the belt by means of the detenting locking device. Hereby, the total pulling forces act on the detenting locking device and also on the belt shaft when the device is blocked, so that these parts must be made very strong and massive, to be capable of withstanding the extremely large pull-forces in case of danger. This strong system is uneconomical with respect to construction and cost, and furthermore, suffers from its high inertia, whereby the normal motion of the safety belt is made more difficult, and the reaction time of the safety belt is increased.

On the other hand, braking- or clamping devices for safety belts are known (Great Britain Patent Specification No. 1 416 517, German Published Non-Prosecuted Application No. 19 49 061), wherein the belt band is deflected over several braking rollers, so that the belt is braked by the thereby generated high friction forces when a pulling force is acting on the belt, or wherein at a certain acceleration of the belt, the belt is mechanically strongly pressed between clamping jaws or clamping rollers, and is in this manner prevented from being pulled out further. In both cases there is no assurance that the belt which is in tension is actually also blocked (arrested) within a very short time span, and reliably prevented from being pulled out any further.

SUMMARY OF THE INVENTION

An object of the invention is to provide an automatic roll-up device of the initially described type, wherein the parts associated with the automatic roll-up and control devices can be made very simple, with little mass, as a light weight structure, and the complete blocking of the belt in case of danger is assured absolutely.

With the foregoing and other objects in view, there is provided in accordance with the invention, an automatic roll-up device for retarding movement of a safety belt of a vehicle when a predetermined acceleration or deceleration of the vehicle is exceeded, connected to a braking- or clamping device in which the retarded belt is arrested, which comprises a housing for the roll-up device, a belt roller on which the belt is wound, a belt roller retarding mechanism for retarding rotation of the belt roller, to thereby retard unwinding of the belt, at least one sensor for activating the retarding mechanism when the vehicle exceeds a predetermined acceleration or deceleration, a braking- or clamping device through which the belt from said roll-up device passes, and braking- or clamping means to arrest the belt upon change in movement of the belt therethrough due to retarding the belt by the retarding mechanism retarding the belt roller.

Other features which are considered as characteristic for the invention are set forth in the appended claims.

Although the invention is illustrated and described herein as embodied in an automatic roll-up device for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 4 particularly shows the relationship of the two sensors to the mechanism and FIG. 5 shows the assembly.

DETAILED DESCRIPTION OF THE INVENTION

Figure 1:
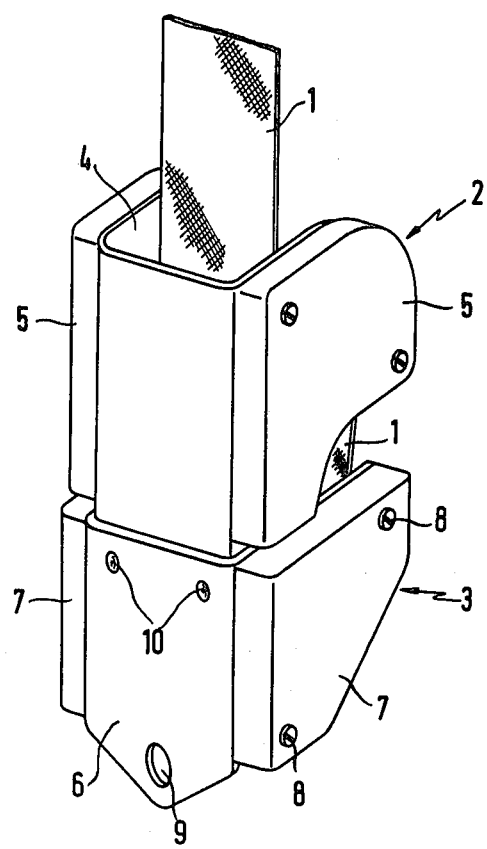
FIG. 1 is a perspective view of the automatic roll-up device according to the invention in which a U-shaped housing with side covers embracing a retarding mechanism is disposed above a braking- or clamping device in a U-shaped housing with side covers.

By combining the braking- or clamping device, which absorbs the actual pulling forces after activation, with the belt retarding-mechanism which acts in conjunction with one or several activating sensors, there is achieved, by the triggering of the activating sensor, an extremely rapid activation of the braking- or clamping device effected by the belt roller retardation mechanism. Thereby it is assured that during the time the device is operating, the full pulling force never acts on the belt roller and the parts connected with it, so that these parts can be made of a light structure. The belt roller retardation mechanism acts only as a control element or trigger element for the braking- or clamping device, and does not block the belt roller completely, but permits a short lead or run out of the belt which serves to activate the clamping device. Extensive experiments have shown that operation of the clamping device would also be possible by the so-called film spool effect, i.e. by the further rolling out of the belt from the blocked belt roller, whereby the full pull-force does not act on the belt roller. However, the forces acting on the belt roller are already so great, that a strong construction of the belt roller and of the parts connected with it is absolutely necessary.

In a preferred embodiment, a spring force is used as an essential part of the belt roller retardation mechanism which permits a relative motion between the belt roller and the control disc which has been blocked by the activating sensor. The braking- or clamping device becomes fully effective during this relative motion.

In the alternate means, a slip clutch is provided as an essential part of the belt roller retardation mechanism. The slip clutch also effects a braking moment on the belt roller and as a result, the braking- or clamping device is applied.

Any system can be used as the braking- or clamping device, which can be operated directly by the belt roller retardation device which works in conjunction with the activating sensor, or indirectly by the retarded belt band. The braking- or clamping device can also be provided with friction rollers which are movable with respect to each other, and/or with brake shoes which, in case the device is activated, move to a braking- or clamping position. A preferred braking- or clamping device has a locking pawl against which a braking roller can be moved and arrested by friction or from locking, whereby the surface of the braking roller exhibits high adhesive friction with respect to the belt band, and the braking roller can move into a clamping position where it clamps the belt by moving with respect to a clamping bar which is fastened to a carrier and with respect to the belt which runs in front of the clamping bar.

Further advantageous details of the invention can be learned from the typical embodiments shown in the drawings and described in the following.

FIG. 1 shows an automatic roll-up device for a safety belt 1 in a perspective representation from the back. Essentially it consists of a mechanism 2 to retard the belt 1 and a braking- or clamping device 3. A U-shaped housing 4 with side covers 5 serves as the carrier for the mechanism 2. Likewise, a U-shaped housing 6 serves as a support or carrier for the braking- or clamping device 3. Covers 7 are attached with screws 8 onto the free legs of said housing. The intermediate legs of the two housings 4 and 6 are connected with each other to form an integral one-piece structural unit. This unit can be secured to the frame of a motor vehicle by means of the mounting hole 9. A rivet, for example, may be used to connect the two housings 4 and 6.

Figure 2:
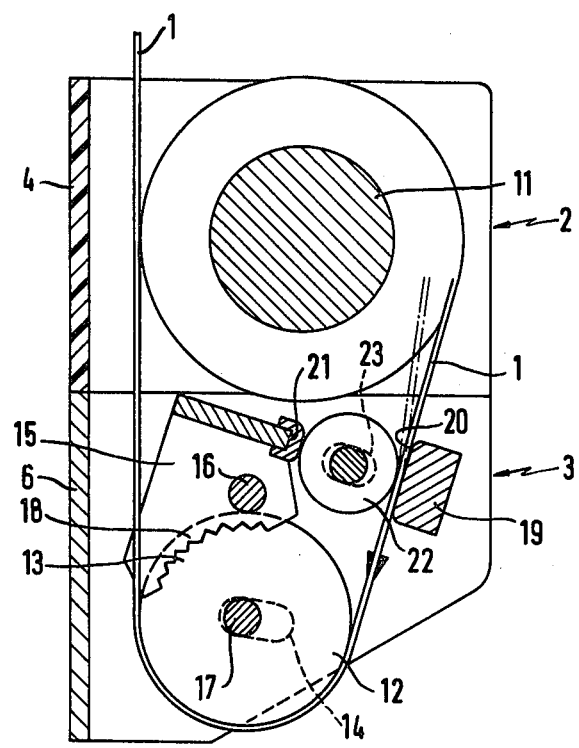
FIG. 2 is a simplified sectional view of the automatic roll-up device according to FIG. 1, showing the belt roller and the relationship of the braking roller, locking pawl, clamping roller and clamping bar of the braking- or clamping device.

FIG. 2 shows a median section through the automatic roll-up device shown in FIG. 1. The mechanism 2 for retaining the belt has a belt roller 11 which is only schematically indicated, on which a certain amount of belt is wound up. The pull-out direction of the safety belt 1 is indicated by an arrow. The mechanism 2 in FIG. 2 is provided with vehicle-sensitive and belt-sensitive activating means, not shown, which by the effect of a certain predetermined acceleration on the vehicle or on the person cause a control device of the rotating belt roller 11 to be instantaneously blocked. The braking- or clamping device 3 is arranged after the belt roller 11, seen in the direction of the belt. Device 3 is provided with a braking roller 12 which has a smooth, non-skid surface of high friction, and has, at both sides of the smooth roll surface, locking teeth 13. The braking roller 12 with its locking teeth 13 is slideably supported in slots 14 of the housing 6. A metallic locking pawl 15 is hingeably supported on an axis 16 in the immediated vicinity of the braking roller 12. The braking roller 12 is kept to the right in the slots 14 in FIG. 2, and the locking pawl 15 pushed counter-clockwise by a spring, not shown, which is supported at a stop on the locking pawl 15 at one side, and at the support shaft 17 at the other side. In this position the locking teeth 13 of the braking roller 12 maintain a distance from a circle-segment-like set of locking teeth 18 of the locking pawl 15. A clamping bar 19 in a slightly slanted position is stationary and fixedly supported between the U-shaped legs of the housing 6. A clamping roller 22 is arranged between the clamping surface 20 of the clamping bar 19 and a pressure pad 21 of the locking pawl 15. The support shaft of the clamping roller 22 is slideably supported in slots 23 of the housing 6. This clamping roller 22 is held, in its normal position, by a form-spring, not shown, which is under tension arranged between the clamping bar 19 and the clamping roller 22, or its support shaft. In this position, the surface of the roller 22 is spaced from the clamping surface 20 of the clamping bar 19. The belt 1 is partially wrapped around the surface of the braking roller 12. To the side at the guide path of the belt band 1 is the clamping bar 19 with rounded corners over which the belt slides freely, or the clamping bar 19 may be spaced slightly away from the belt 1. In the shown embodiment, the braking roller 22 lightly touches the belt 1 and rotates with its movement. When activated, i.e. when pulling forces act on the belt 1, the control device is blocked and the belt roller is braked or retarded. By the braking forces now acting on the belt 1, according to FIG. 2, the braking roller 12 is pressed with its locking teeth 13 in the locking teeth 18 of the locking pawl 15, whereby the braking roller 12 is also blocked. The braking roller 12 on which a turning moment continues to act, presses the locking pawl 15 in the direction toward the clamping bar 19 causing the pressure pad 21 to bear onto the clamping roller 22. The latter clamps against the belt 1 with its clamping surface 20 and arrests it thereby. The clamping force increases with an increasing pull at the belt 1. After this action, no forces are acting on the device which retards the belt; theses forces are completely absorbed by the explained braking- and clamping device. The construction and functioning of the belt roller-retardation arrangement is explained with the aid of FIGS. 3, 4 and 5. The U-shaped housing 4 which may consist of aluminum or plastic, is provided with bearing openings 24 in the free legs. The belt roller 11 has a cylindrical bearing opening 25, and also a radial groove 26 for arresting the end of the belt, which, for this purpose, is a thickened portion 27 in the form of a loop for a pin 28. A four-cornered shaft 29 for the belt roller 11 has a (nail) head 30 at its end. A spring-counter support 31 can slide on said shaft 29 up to its head 30. The counter support 31 has a corresponding four-corner opening 32, and is provided with a radial slot 33 in which the inner end 34 of spiral wind-up spring 35 is secured. The other end of spring 35 is supported in a conventional manner at a counter support which is fixed to the housing. Furthermore, the spring-counter support 31 has two follower teeth 36, which engage with corresponding toothed-recesses 37 in the wall of the bearing opening 25 of the belt roller 11, whereby a coupling is formed which is rigid with respect to rotation. The outer surface of the spring-counter support 31 forms the axle-support for the belt roller 11. The other axle support is formed by a support collar 38, which is also provided with an axial four-corner opening 40, and also with follower teeth 41, by which the support collar is coupled fixedly with respect to rotation with the belt-roller 11. The support collar 38 has, on the other side, a ring-shaped shoulder hub 39, on which a control disc 41, provided with fine outer teeth 42, is supported and freely rotatable thereon. A driver disc 43 is disposed adjacent to the control disc 41. The control disc 41 and the driver disc 43 are axially compressed and fixed by a tension washer 44 which can be pressed and secured on the four-corner shaft 29. The control disc 41 is provided at the inside with a storage pocket 45 which contains an inertial mass 46 in the form of a two-armed lever. This inertia mass 46 can tilt on a pin 46', and is pressed with one leg against a stop 49 within the storage pocket 45 in the non-activated position, as shown in FIG. 4. A ring 50 with inner teeth 51 is fastened to the housing 4 by locating-detents. As especially shown in FIG. 5, in the assembled position the control disc 41 is disposed outside of the inner teeth 51 of the ring 50, while the inertia mass 46 is at the height of the inner teeth 51, and in the rest position, i.e. in the non-activated position, is kept away from the inner teeth 51 by a spring 48. The control disc 41 has a concentric cut-out 52 of annular shape in which a curved spring 53 is retained. In the embodiment, the mentioned driver pin 47 is fastened to the tension washer 44. The driver pin 47 is supported in and extends through a passage opening 54 in the driver plate 43, which is rotationally in a fixed connection with the shaft 29 due to the four-cornered hole in plate 43. Pin 47 extends into the recess 52 of the control disc 41 and bears against the spring 53, as shown in FIG. 4. In this position, the described arrangement is in the rest position. To prevent pin 47 from being shifted axially outward, the pin 47 is held by the tension washer 44 in the position shown in FIG. 5, i.e. the tension washer 44 covers the opening 54 in the disc 43. Mechanical fastening of the washer 44 to the pin 47 is not required. In the described embodiment, a vehicle-sensitive activating sensor, designated 55, consists of a carrier 56 which is fixed to the housing for an inertia ball 57, and a hingeable locking lever 58 which moves in the direction toward the outer teeth 42 of the control disc 41 when the inertia ball 57 is displaced from its middle rest position.

When activated, i.e. at the occurrence of an acceleration which exceeds a predetermined value of the vehicle, or at a corresponding pull at the belt band, either the vehicle-sensitive activating sensor 55, or the belt-sensitive activating sensor (inertial mass 46) is released, and as a result, the control disc 41 is immediately blocked. However, the shaft 29 and, thereby, the belt roller 11 are not immediately blocked, due to a relative motion between the belt roller 11 and the control disc 41, with spring 53 being compressed. Consequently, a retarding force is exerted on the belt roller 11 and thereby, on the out-rolling belt 1. During this relative motion, the braking- or clamping device which was described with the aid of FIG. 2, is operated, i.e. it is moved into the clamping- or braking position, and absorbs the total pulling force. Thereby, the mechanism shown in FIGS. 2-5 is completely without load, even before the drive pin 47 has completely compressed the spring 53. Therefore, all these parts need not be made of very strong material, i.e. can be a light-weight structure.

In particular, the control disc 41 can have very fine control teeth 42.

Figure 3:
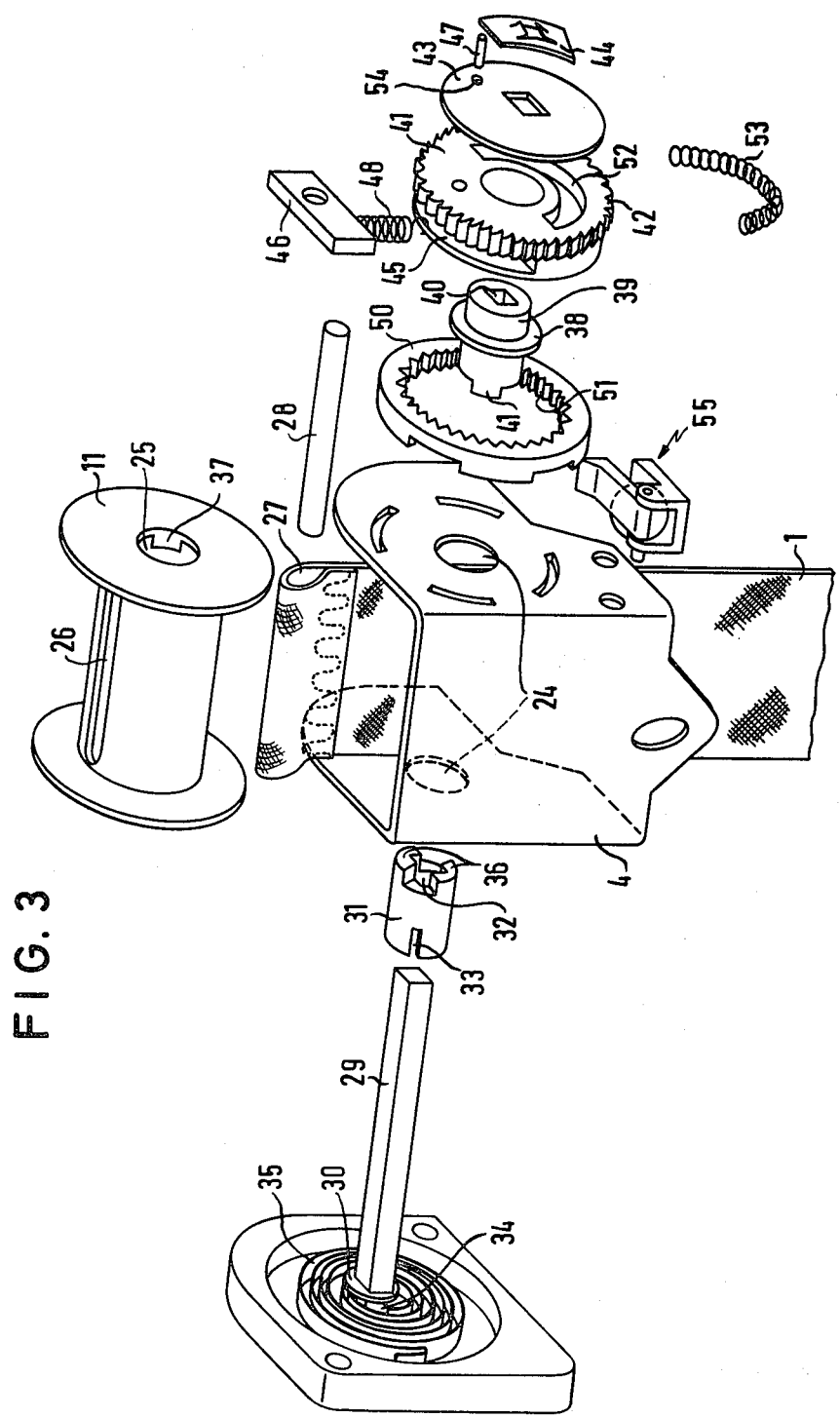
FIG. 3 is an exploded view of a design form of a part of the automatic roll-up device according to FIGS. 1 and 2.
Figure 5:
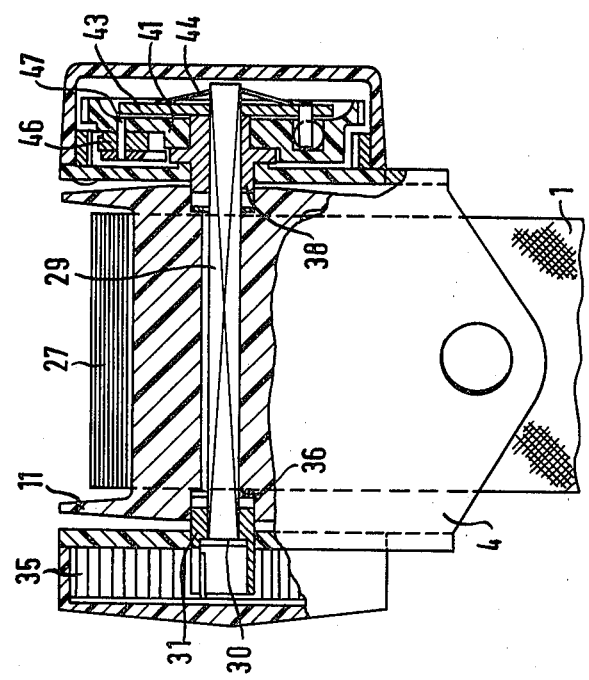
FIGS. 4 and 5 show part of the automatic roll-up device according to FIG. 3 in a side view and a section-plan view.
Figure 4:
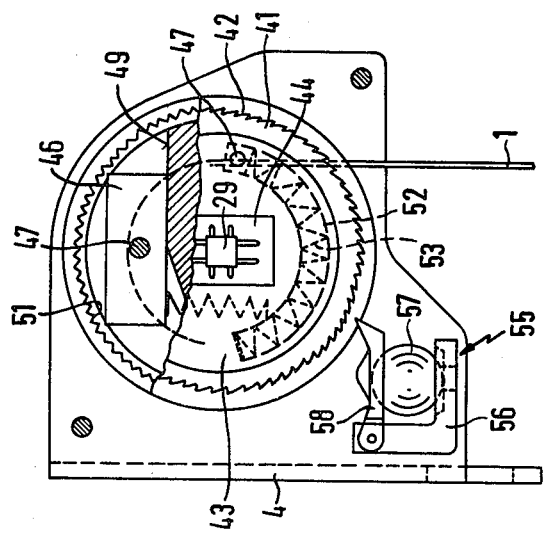
Figure 6:
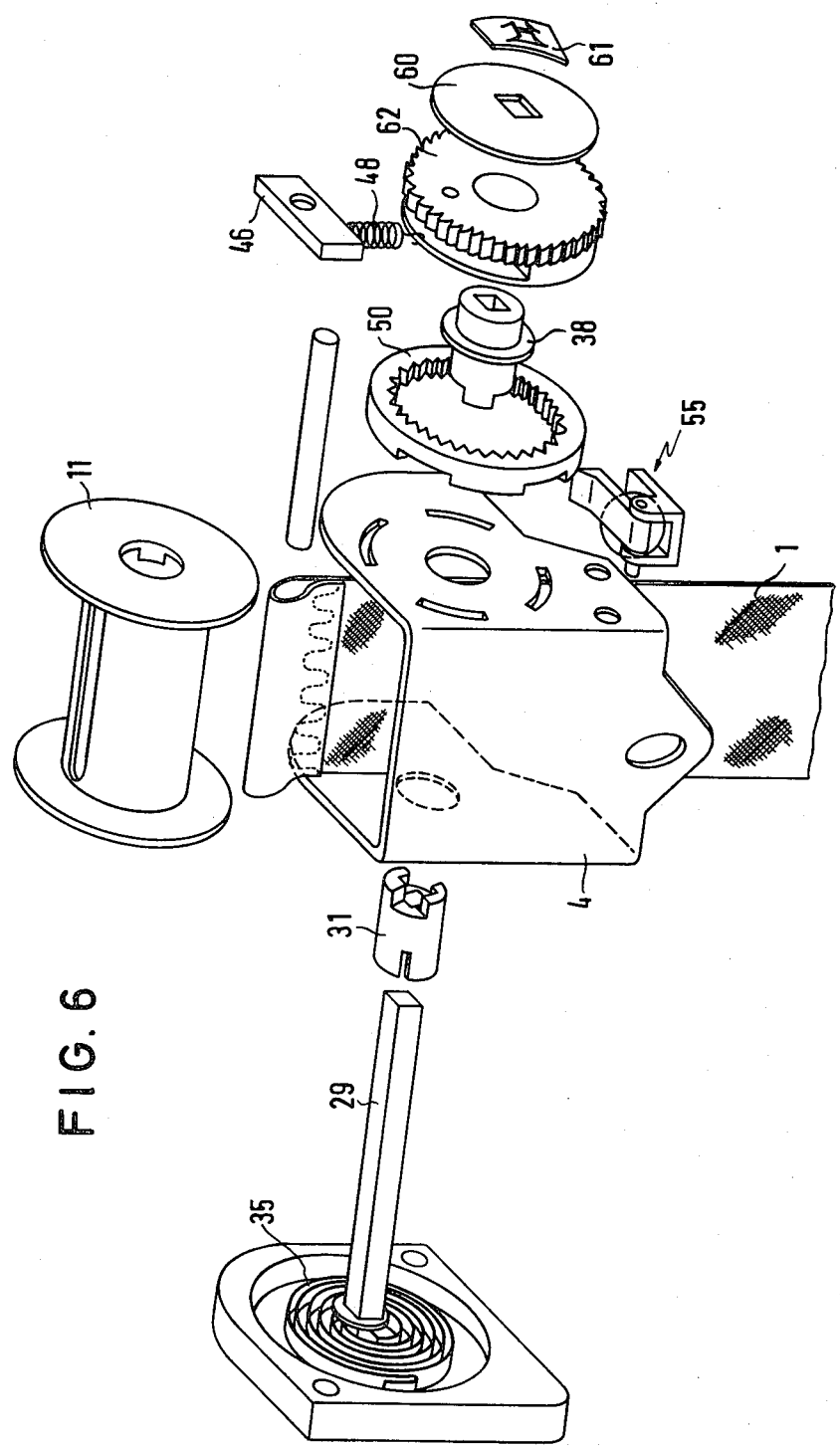
FIG. 6. is an exploded view of a second design form of a part of the automatic roll-up device according to FIGS. 1 and 2.
Figure 8:
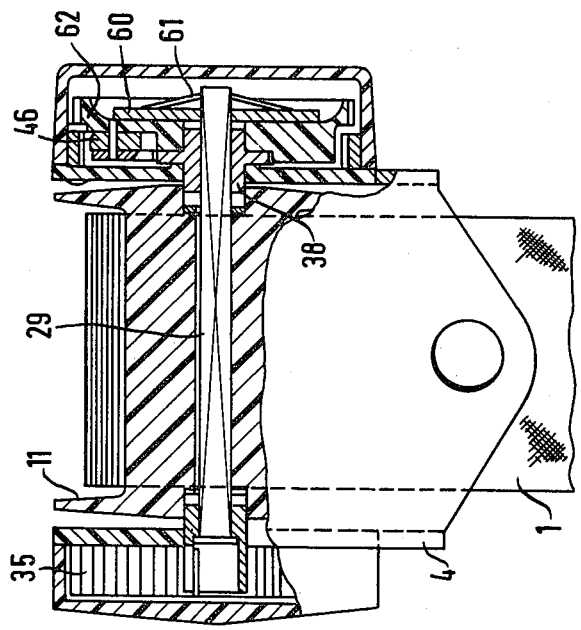
FIGS. 7 and 8 show the part of the automatic roll-up device according to FIG. 6, in a side view and a section-plan view.
Figure 7:
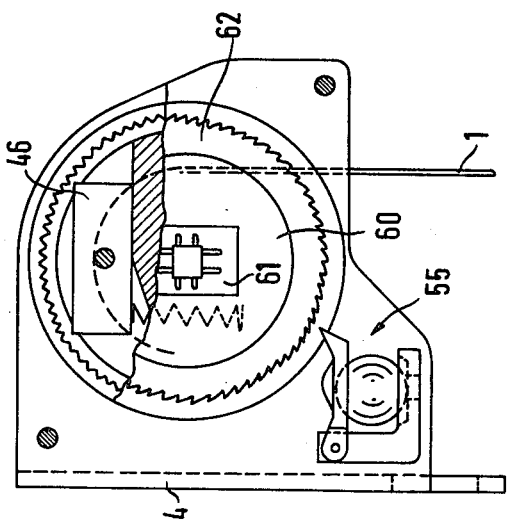

The embodiment according to FIGS. 6, 7 and 8 differs from the preceding embodiment according to FIGS. 3-5 only in the form of the construction of the belt-retarding arrangement. In this embodiment a driver disc 60, for example like a cup-spring, is pressed with a predetermined spring force against the outer surface of the control disc 62. The control disc 62 is freely rotatable on support-hub 38 with respect to the shaft 29, while the driver disc 60 is fixed with respect to rotation on the shaft 29. Hereby, the driver disc 60, tension washer 61 and control disc 62 form a slip clutch. When activated, i.e. when one of the activating sensors 55 or 46 is triggered, the control disc 62 is immediately blocked, and thereby the rotating motion of the belt roller 11 is retarded or braked by the slip clutch. The effect of the braking- or clamping device according to FIG. 2, is the same as in the preceding embodiment. Here, also, the belt roller 12 is pressed, by the braking of the belt 1, against the locking pawl 15, and arrested. Simultaneously, the belt band is clamped at the clamping surface 20 to absorb the entire pulling force, and no longer acts on the part of the mechanism in FIGS. 6-8. Therefore, these parts can also be light weight.

I claim:

1. Automatic roll-up device and belt arresting device for retarding movement of a safety belt of a vehicle and for arresting movement of the safety belt, which comprises a housing for the roll-up device, a rotatable belt roller shaft mounted in the housing, a belt roller on which the belt is wound mounted on the belt roller shaft, a retarding mechanism for retarding unwinding of the belt comprising a control disc with control teeth at its periphery freely rotatable relative to the belt roller shaft, a vehicle sensitive actuating sensor which is actuated when the vehicle exceeds a permissible acceleration or deceleration for impeding rotation of the control disc by contact with said control teeth, a spring supported by the control disc, driver means rotatable with the belt roller shaft which, after rotation of said control disc is impeded, rotates against the force of said spring around a predetermined angular path to retard movement of the belt while permitting withdrawal of the belt, outer teeth affixed to the housing around the control disc, and a belt sensitive actuating sensor in the form of an inertial mass carried by the control disc for impeding rotation of the control disc by contact with said outer teeth, a belt arresting device through which the belt from said roll-up device passes, and arresting means in said belt arresting device to arrest the belt upon change in movement of the belt therethrough due to retarding the belt by the retarding mechanism.

2. Automatic roll-up device according to claim 1, wherein said driver means is a driver disc, adjacent to the control disc, which driver disc is in fixed connection with the belt roller shaft, and wherein the control disc has a concentric cut-out of annular shape with said spring therein, and wherein said driver means comprises a driver pin which engages in the concentric cut-out of annular shape which retains the spring.

3. Automatic roll-up device according to claim 2, wherein said driver pin extends through a passage opening in the driver disc into the cut-out, and wherein the drive pin is prevented from being shifted axially outward by the blockage of said passage opening by a tension washer, which is provided for applying axial pressure at the control disc and driver disc with respect to the belt roller shaft.

4. Automatic roll-up device according to claim 1, wherein the control disc is coupled with the belt roller through a slip-clutch.

5. Automatic roll-up device according to claim 1, wherein said slip clutch is formed by a drive disc which is fixedly connected to the belt roller shaft with respect to rotation and bears on the control disc, said driver disc acting as said driver means and also acting as said spring by rotating against the force of the drive disc bearing on the control disc.

6. Automatic roll-up device according to claim 1, wherein the vehicle-sensitive activating sensor has a locking lever which can engage with the outer teeth of the control disc, and wherein a spring urges the belt-sensitive inertia mass to normal non-activating position spaced from the inner teeth, and wherein the inertia mass can swing against the force of said spring, and can lock in position with the set of inner teeth which are fixedly arranged around and spaced from the control disc.

7. Automatic roll-up device according to claim 1, wherein a support collar is fixedly mounted with respect to rotation on the belt-roller shaft, and wherein the control disc is supported on the collar so that the control disc can rotate relative to the collar, and wherein the collar is coupled with the belt roller by coupling claws or coupling teeth.

8. Automatic roll-up device according to claim 1, wherein the retarding mechanism, belt roller and the housing of the automatic belt roll-up device are made of aluminum.

9. Automatic roll-up device according to claim 1, wherein the retarding mechanism, belt roller and the housing of the automatic belt roll-up device are made of plastic.

10. Automatic roll-up device according to claim 1, wherein the retarding mechanism, belt roller and activating sensors, and also the belt arresting device are combined within a single structural unit.

11. Automatic roll-up device and belt arresting device according to claim 1, wherein the belt arresting device comprises a stationary clamping bar fastened to the housing and disposed behind one surface of the belt passing from the automatic roll-up device, a braking roller slidably supported in slots in the housing around which the belt is partly wrapped, said braking roller having a smooth, non-skid surface of high friction, and has, at both sides of the smooth roll surface, locking teeth, a locking pawl hingeably supported in the housing, said locking pawl having locking teeth spaced a short distance from the locking teeth of the braking roller, a clamping roller slideably supported in slots in the housing disposed adjacent the belt surface opposite the clamping bar to effect clamping of the belt when the clamping roller moves toward the belt, said clamping roller disposed between said belt surface and the locking pawl whereby when the belt movement is retarded, the braking roller with its locking teeth press into the locking teeth of the pawl which bears onto the clamping roller causing clamping of the belt and arresting it thereby.

* * * * *